United States Patent [19]

Allori

[11] 4,312,515
[45] Jan. 26, 1982

[54] SELF-LOCKING STEP ASSEMBLY FOR A VEHICLE

[75] Inventor: Raymond J. Allori, Chicago, Ill.

[73] Assignee: International Harvester Company, Chicago, Ill.

[21] Appl. No.: 114,432

[22] Filed: Jan. 22, 1980

[51] Int. Cl.$^3$ .............................................. B60R 3/02
[52] U.S. Cl. .................................. 280/166; 105/443; 182/91
[58] Field of Search ................ 280/166, 163; 182/91, 182/90, 92; 105/443, 447, 449, 326

[56] References Cited

U.S. PATENT DOCUMENTS

| | | | |
|---|---|---|---|
| 257,202 | 5/1882 | Baer | 248/289.1 |
| 438,021 | 10/1890 | Robbins | 280/166 |
| 817,969 | 4/1906 | Galbraith | 182/91 X |
| 1,230,678 | 6/1917 | Cowan | 248/289.1 |
| 3,199,824 | 8/1965 | Chapps | 248/289.1 |
| 3,329,443 | 7/1967 | Lowder et al. | 280/166 |
| 4,140,327 | 2/1979 | Hackney | 280/166 X |

Primary Examiner—Joseph F. Peters, Jr.
Assistant Examiner—Milton L. Smith
Attorney, Agent, or Firm—Douglas W. Rudy; F. David AuBuchon

[57] ABSTRACT

A self-locking step assembly is attached to a vehicle by rigidly connecting the outer cylinder of the assembly to the vehicle frame. The outer cylinder is secured with the centerline of its concentric inner and outer walls being substantially vertical. The inner cylinder of the assembly is slidably and rotatably positioned within the inside wall of the outer cylinder. The inner cylinder has a step secured to its bottom section, with the step being substantially perpendicular to the inner cylinder. The assembly also utilizes a locking pin that is rigidly secured to one of the inner or outer cylinders, and a cam slot that is in the other of the inner and outer cylinders. The pin engages the cam slot which has first and second portions connected by a third portion. When the pin is in the first portion of the cam slot, the step is held in its used position by gravitational forces. When the pin is in the second position of the cam slot, the pin is held in its stored position by the same gravitational forces. Finally, when the pin is in the third portion of the cam slot, the operator is moving the step between its stored and used positions.

3 Claims, 6 Drawing Figures

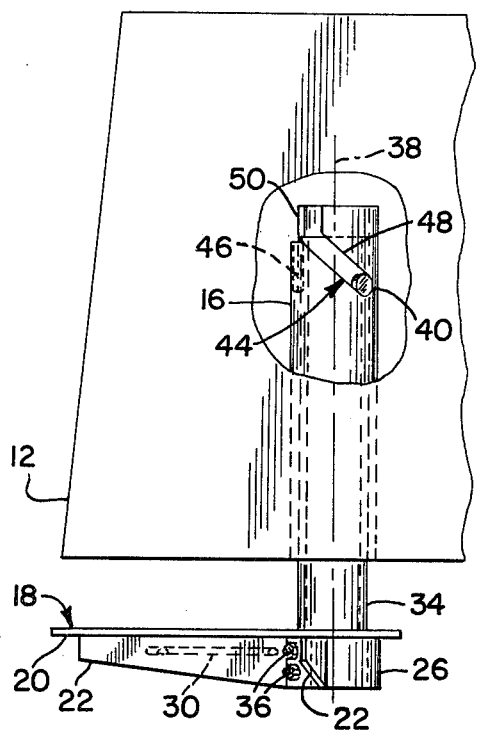
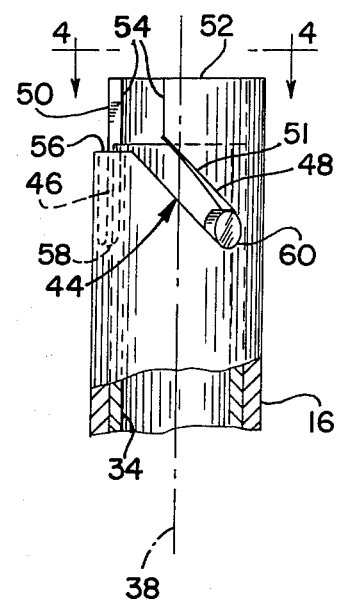
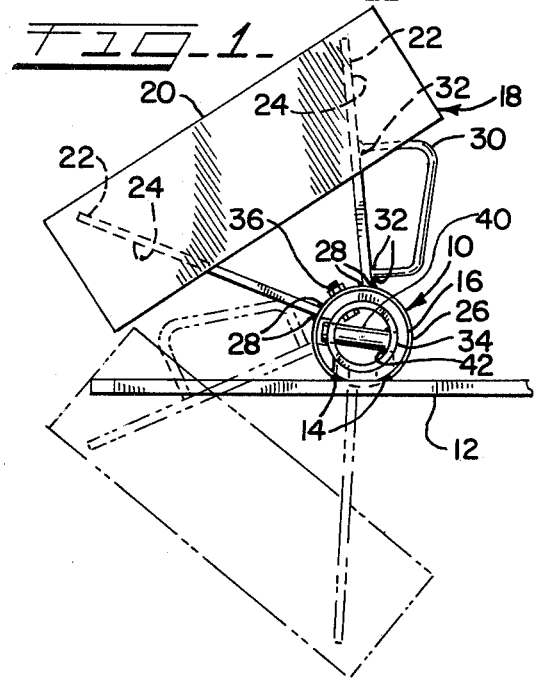
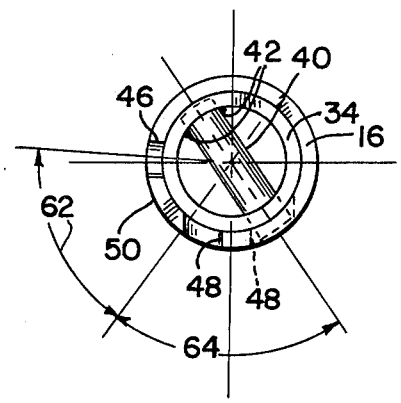

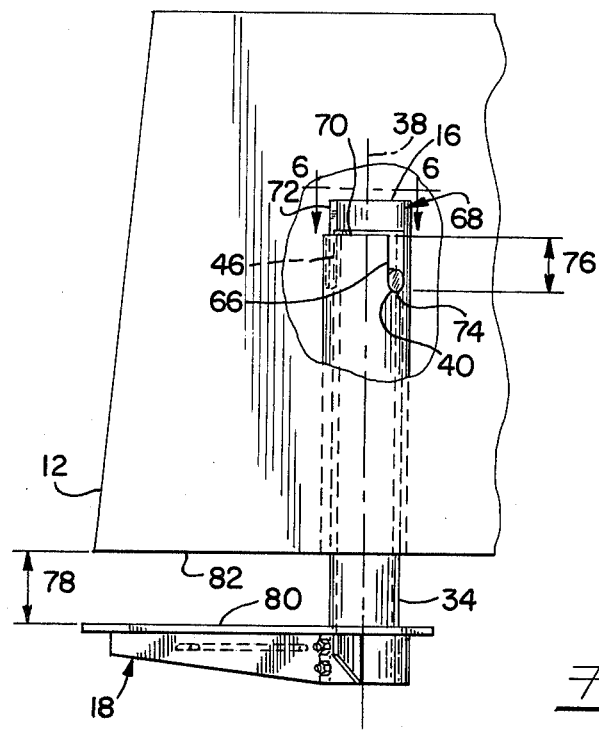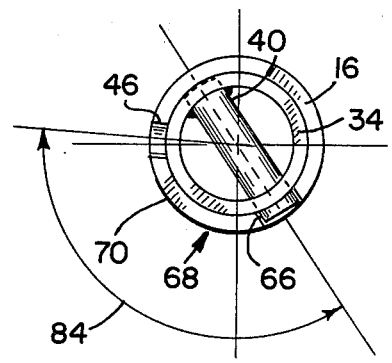

SELF-LOCKING STEP ASSEMBLY FOR A VEHICLE

BACKGROUND OF THE INVENTION

This invention relates generally to a step for a vehicle, and more particularly concerns a self-locking vehicle step.

There is a recent trend in the agricultural industry toward using larger, more efficient units of land, that enable the farmer to take advantage of the more efficient working performance of higher horsepower tractors and their related implements. Although these higher horsepower tractors are more efficient while they are working in the field, their increased horsepower requirements have resulted in very high profiles.

The high profiles have produced many maintenance and servicing problems for the farmer and the serviceman who must perform the maintenance and servicing operations. One of these problems is that the high profile greatly limits the operator's/serviceman's access to the tractor components by increasing the height of the components off the gound.

To improve the overall efficiency of the larger tractors, they should be equipped with a conveniently located device that raises the operators and servicemen to the level of the elevated components, e.g. fuel tank filler necks and coolant system components. In order to be truly beneficial to the operator/serviceman, the device must be easy to use and it must not interfere with the operation of the tractor.

In addition, the device should be a simple structure that will not itself unduly increase the cost of maintenance and servicing of the tractor. Finally, the device should be easily maneuvered by the operator/serviceman without the need for assistance from tools, e.g. pliers, screwdrivers and wrenches.

Accordingly, it is an object of the present invention to provide a self-locking step for a vehicle.

With more particularity, it is an object of the present invention to provide a self-locking vehicle step that utilizes gravity to automatically secure the step in its stored and used positions.

More specifically it is an object of the present invention to provide a gravity controlled, self-locking vehicle step that has a simple structure to minimize the maintenance and service it requires.

SUMMARY OF THE INVENTION

A self-locking step assembly is attached to a vehicle by rigidly connecting the outer cylinder of the assembly to the vehicle frame. The outer cylinder is secured with the centerline of its concentric inner and outer walls being substantially vertical. The inner cylinder of the assembly is slidably and rotatably positioned within the inside wall of the outer cylinder. The inner cylinder has a step secured to its bottom section, with the step being substantially perpendicular to the inner cylinder. The assembly also utilizes a locking pin that is rigidly secured to one of the inner or outer cylinders, and a cam slot that is in the other of the inner and outer cylinders. The pin engages the cam slot which has first and second portions connected by a third portion. When the pin is in the first portion of the cam slot, the step is held in its used position by gravitational forces. When the pin is in the second position of the cam slot, the pin is held in its stored position by the same gravitational forces. Finally, when the pin is in the third portion of the cam slot, the operator is moving the step between its stored and used positions.

BRIEF DESCRIPTION OF THE DRAWING

Other objects and advantages of the invention will become apparent upon reading the following detailed description and upon reference to the drawings, in which:

FIG. 1 is a top view of the preferred embodiment of the present invention secured to the frame of the vehicle;

FIG. 2 is a right side view of the preferred embodiment and frame of FIG. 1;

FIG. 3 is an enlarged right side view of the top portion of the preferred embodiment of FIG. 1;

FIG. 4 is a top view along line 4—4 of FIG. 3;

FIG. 5 is a right side view of the alternative embodiment of the present invention secured to the frame of the vehicle; and FIG. 6 is an enlarged top view along line 6—6 of FIG. 5.

While the invention will be described in connection with specific embodiments, it will be understood that it is not intended to limit the invention to those embodiments. On the contrary, it is intended to cover all alternatives, modifications and equivalents as may be included within the spirit and scope of the invention as defined by the appended claims.

DETAILED DESCRIPTION OF THE INVENTION

Turning first to FIG. 1, there is shown the present invention's preferred embodiment's step assembly generally 10 secured to the frame 12 of a vehicle. The assembly 10 is secured to the frame 12 by the weldment 14 of the assembly's outer cylinder 16 to the frame 12.

FIG. 1 also shows the preferred embodiment's assembly to include a step generally 18 that has a plate 20 rigidly secured to a pair of braces 22 by weldments 24. The braces 22 are also rigidly secured to the hub 26 by weldments 28. The final element of the step is the handle 30 which is rigidly secured to one of the braces 22 by weldments 32.

The hub 26 of the step 18 is rigidly secured to the preferred embodiment's inner cylinder 34 by a pair of nuts and bolts 36, as shown in FIGS. 1 and 2. These figures also show that the hub 26 and the outer cylinder 16 fit over the inner cylinder 34, with the hub, the inner cylinder and the outer cylinder being concentric about the common vertical centerline 38. In addition, these figures show a locking pin 40 passing through and being rigidly secured to the inner cylinder 34 by weldments 42. The portion of the pin 40 which extends outside the inner cylinder 34 engages the cam slot generally 44 of the outer cylinder 16.

The step 18 is shown in its used position in solid lines in FIG. 1, with the locking pin positioned in the first portion 46 of the cam slot 44. The step shown in phantom lines in FIG. 1 and in solid lines in FIG. 2 is in its stored position with the locking pin 40 positioned in the second portion 48 of the cam slot 44.

The details of the preferred embodiment's cam slot 44, and the interaction of the cam slot 44 and the locking pin 40 are readily understood by making reference to the enlarged views of FIGS. 3 and 4. These views show the cam slot 44 includes a third portion 50. The third portion 50 is a cutout that connects the upper end 52 of the outer cylinder 16 with both the first 46 and second 48 portions of the cam slot 44. The third portion 50 incorporates two vertical edges 54 that connect each of the first 46 and second 48 portions to the upper end 52 of the outer cylinder. The third portion 50 also incorporates a bottom edge 56 that connects the first portion 46 with the second portion 48.

Continued examination of FIGS. 3 and 4 shows the first portion 46 to be a notch which extends substantially and vertically downward to its bottom end 58 from the bottom edge 56 of the third portion 52. Similarly, the second portion 48 is shown to be a second notch that extends downwardly from the bottom edge 56. However, the notch of the second portion 48 also angles away from the first portion as it descends from the bottom edge 56 to its lower end 60.

With the above explanation of the components of the preferred embodiment, it will be understood that when the vehicle is stopped and the step is being used for service or maintenance operations, the step will be held in used position (solid line in FIG. 1) by gravitational forces holding the pin 40 at the bottom end 58 of the first portion 46 of the cam slot 44. It will also be understood that when the service or maintenance operations are completed, the operator/serviceman need only grasp the step handle 30, manually raise the step 18 until the pin 40 is slightly above the bottom edge 56 of the third portion 50 of the cam slot 44, and then rotate the step 18 through the arc 62 (see FIG. 4) to put the step into its stored position (phantom line in FIG. 1).

Once the step has traversed the arc 62, gravitational forces will move the step and pin 40 through the arc 64 of the second portion 48 of the cam slot 44 to the lower end 60. When the vehicle is subsequently moved, the step will be held in the stored position by the combined action of gravity and the top surface 51 of the second portion 48 of the cam slot 44. The downward and angular orientation provides the additional locking action in the stored position, through the top surface 51 of the second portion 48 blocking the straight upward movement of the pin 40 caused by the vehicle receiving extreme vertical impact loads, while it traverses rough terrain. It will also be apparent that the operator will move the step from its stored position to its use position by reversing the above procedure.

The alternative embodiment which, utilizes another simple configuration to provide a gravity controlled self-locking vehicle step is shown in FIGS. 5 and 6. The elements and their arrangement in the alternative embodiment are substantially identical to those of and in the preferred embodiment except for modifications in the cam slot. Therefore, for the sake of brevity, the above explanation is to be applied to the alternative embodiment with the following modifications.

The modifications to the cam slot are limited to changes in the second and third portion of the cam slot. The alternative embodiment's second portion 66 of its cam slot generally 68 extends substantially vertically downward from its connection with the bottom edge 70 of the third portion 72. A comparison of the structures of the third portions 50 and 72 of FIGS. 3 and 5 respectively will show the bottom edge 56 of the first embodiment shown in FIG. 3 has been extended to form the alternative embodiment's bottom edge 70.

Further study of the alternative embodiment structure in FIG. 5 shows that the second portion 66 extends to its lower end 74 which is a distance 76 from the bottom edge 70 of the third portion 72. The distance 76 is less than the distance 78 between the top surface 80 of the step 18 and the bottom surface 82 of the frame 12. This dimensional relationship is necessary to prevent contact between the step 18 and the frame 12 when the operator/serviceman is moving the step between its stored and used positions with a stored position that places the step under the frame.

By thus modifying the preferred embodiment structure, the alternative embodiment provides a step with a simple configuration that the operator/serviceman can move between the stored and used positions when he grasps the handle 30, elevates the step 18 and pin 40 onto the third portion 72, rotates the step and pin through an arc 84 and then release the handle. Like the preferred embodiment, when the operator releases the handle, gravity will move the step and pin downward and lock the step in either the stored or used position.

Thus it is apparent that there has been provided in accordance with the invention, a self-locking vehicle step that fully satisfies the objects, aims and advantages set forth above. While the invention has been described in connection with specific embodiments thereof, it is evident that many alternatives, modifications and variations will be apparent to those skilled in the art in light of the foregoing description. Accordingly, it is intended to embrace all such alternatives, modifications and variations as followed in the spirit and broad scope of the appended claims.

What is claimed is:

1. A self-locking step assembly for a vehicle having a frame, said assembly including an outer cylinder rigidly secured substantially vertically to said frame, an inner cylinder slidably and rotatably positioned within said outer cylinder, a step secured to the bottom section of said inner cylinder substantially perpendicular to said inner cylinder, a locking pin secured to one of said inner and outer cylinders, and a cam slot in the other of said inner and outer cylinders engaging said pin in a first portion to establish the used position of said step, and in a second portion to establish the stored position of said step and in a third portion connecting said first and second portions establishing the transition position of said step, said step being restrained in said used and stored positions by gravity and being manually movable between said used and said stored position wherein;
   said pin is secured to said inner cylinder in close proximity to the top of said inner cylinder;
   said step is detachably and rigidly secured to said inner cylinder;
   said cam slot is in said outer cylinder in close proximity to the top of said outer cylinder; and
   said third portion of said cam slot is a cut out connecting said first portion, said second portion and said top of said outer cylinder, whereby said pin can be disengaged from said cam slot when said step has been disengaged from said inner cylinder.

2. The invention in accordance with claim 1 wherein:
   said step includes a plate and a handle rigidly secured to a brace, said brace is rigidly secured to a hub and said hub is detachably and rigidly secured to said inner cylinder.

3. The invention of claim 2, wherein:
   said inner cylinder is rigidly secured to said pin; and
   said outer cylinder contains said cam slots.

* * * * *